Oct. 12, 1943.　　　　W. BANTA　　　　2,331,593
MOTOR VEHICLE
Filed April 19, 1940
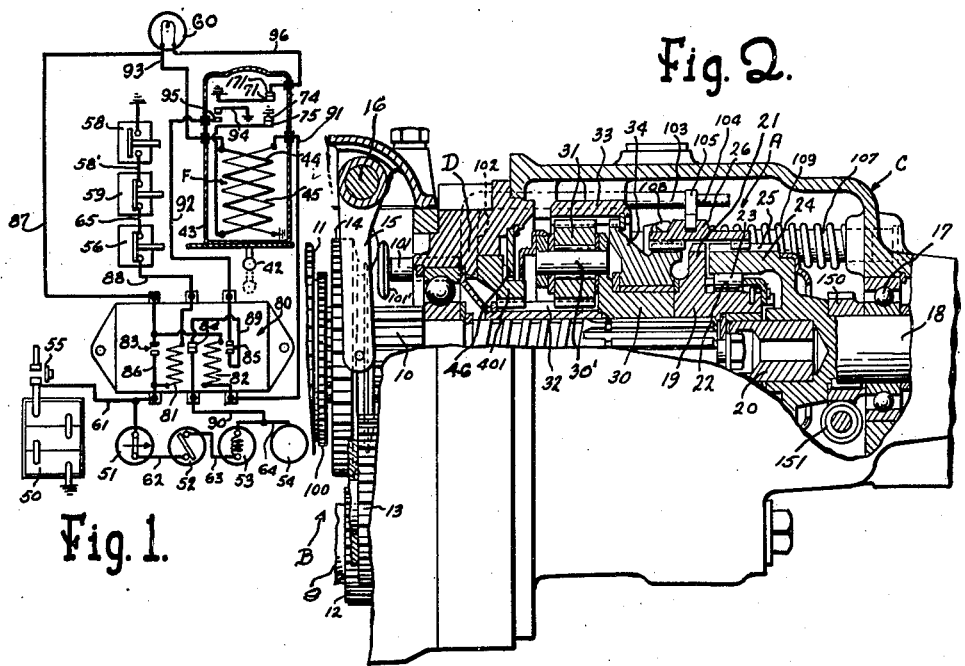
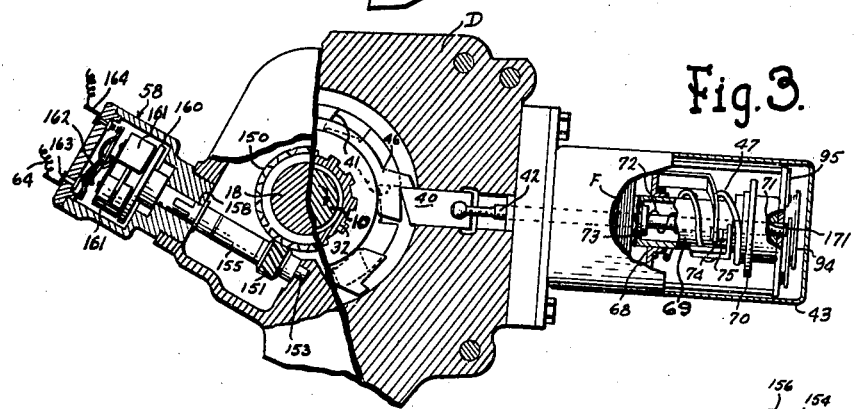
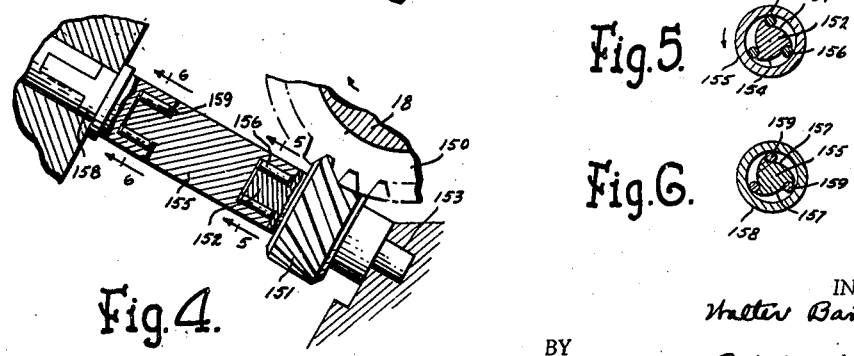
INVENTOR.
Walter Banta
BY
Sibbetts & Hart
ATTORNEYS Patented Oct. 12, 1943

2,331,593

UNITED STATES PATENT OFFICE 2,331,593

MOTOR VEHICLE

Walter Banta, Detroit, Mich., assignor to Packard Motor Car Company, Detroit, Mich., a corporation of Michigan Application April 19, 1940, Serial No. 330,540

5 Claims. (Cl. 74—260)

This invention relates to motor vehicle transmission mechanism and more particularly to the type including an overdrive.

Motor vehicle transmission mechanism is now commonly equipped with drive modifying mechanism such as an overdrive or an underdrive. Usually the driven transmission shaft is coupled with planetary gearing and the planetary gearing is coupled with the tail shaft, the latter coupling usually being in the form of a shiftable positive clutch that can be coupled directly to the transmission shaft for a direct drive. This positive clutch is usually arranged to be shifted either by means of a Bowden wire extending to the instrument board for actuation by the driver or automatically by means of the shift mechanism of the transmission for establishing reverse drive. The planetary sun gear is arranged to be held or released by a pawl under the control of a solenoid in an electrical system having several switches in series. One of these switches is controlled by a governor and the others are usually operable by the driver. When all of the switches are closed, the pawl is actuated to hold the sun gear and establish overdrive through the planetary gearing, and when any one of the switches is open then the pawl will release the sun gear so that the drive will be direct either through a one-way clutch or through the positive clutch.

With the two-way clutch held in direct coupling relation while the transmission is driving in reverse, it has been possible for the governor switch to function to move the pawl into holding relation with the sun gear and under such condition breakage will occur because of the coupling of the positive clutch with the planetary, the transmission shaft and the tail shaft.

It is an object of the invention to provide driving mechanism of the character referred to in which the sun gear cannot be held while the drive is in reverse.

Another object of the invention is to provide driving mechanism of the character referred to in which the governor switch is ineffective to establish overdrive while driving in reverse.

A further object of the invention is to provide a drive for a governor controlled switch in transmission overdrive mechanism that is operative only while the transmission is driving in one direction.

Other objects of the invention will appear from the following description taken in connection with the drawing, which form a part of this specification, and in which:

Fig. 1 is a diagrammatic showing of the electric system for controlling drive modifying mechanism;

Fig. 2 is a side elevation, partly broken away, of a transmission incorporating the invention;

Fig. 3 is a fragmentary sectional view of the control pawl for the planetary gearing of drive modifying mechanism with the clutch shifting mechanism in locked position, and of the governor controlled switch in the pawl control system;

Fig. 4 is an enlargement of a portion of the drive mechanism shown in Fig. 3 partly in section;

Fig. 5 is a sectional view taken on line 5—5 of Fig. 4;

Fig. 6 is a sectional view taken on line 6—6 of Fig. 4.

The drive modifying mechanism indicated at A is arranged at the rear of a transmission B and both are carried in a casing C having a partition wall D. The transmission is of a conventional change speed gearing type commonly employed with motor vehicles and includes a driven shaft 10, a low forward speed drive gear 11, a reverse idler gear 13 driven by gear 12 splined on the lay shaft 9 and a clutch and gear member 14 slidably splined on shaft 10 to drivingly engage either the low speed drive gear or the reverse idler gear. The clutch and gear member can be shifted by operation of yoke 15 mounted on shaft 16 and actuated by suitable manually operable mechanism (not shown).

Driven transmission shaft 10 extends through the casing partition wall D and aligned rearwardly thereof is the tail shaft 18 suitably mounted in bearings 17 in the casing rear wall. A clutch hub 19 is splined to the rear end of the driven shaft and at its rear end serves as a bearing for the pilot 20 extending into the tail shaft. Hub 19 also has a tooth clutch plate 21 and cam surfaces 22 formed therewith, the cam surfaces having rollers 23 mounted thereon. The tail shaft has an enlarged forward annular rim portion 24, the interior surface of which acts as a bearing for the rollers 23 and the outer surface of which is formed with clutch teeth 25. A shiftable sleeve clutch 26 drivingly engages the clutch teeth 25 in all positions of its adjustment and can be shifted into or out of engagement with the clutch plate 21. When clutch 26 engages clutch plate 21 direct two-way positive drive will be established from the driven shaft 10 to the tail shaft 18. When the clutch 26 is disengaged from clutch plate 21 then the one-way drive can be established by the overrunning clutch rollers 23 wedging between the cam surfaces 22 on the hub 19 and the tail shaft rim portion 24.

Between clutch plate 21 and the casing partition wall D is arranged planetary gearing by means of which a modified drive can be established from the transmission shaft 10 to the tail shaft. A carrier 30 is splined to the driven shaft 10 and carries pins 30' on which planet gears 31 meshing with the sun gear 32 and ring gear 33 are mounted. The sun gear is rotatably mounted on shaft 10. An extension 34 is drivingly splined to the planetary ring gear and is constantly engaged by the sleeve clutch 26 to establish a drive from the planetary gearing to the tail shaft when the sun gear is held stationary. The sun gear has a ring extension 401 splined thereon having recesses 41 in its periphery.

The sun gear ring extension lies partly in a recess in the partition wall D and pawl 40 is slidably mounted in the wall for movement into or out of one of the sun gear recesses 41. When engaged in one of such recesses, the pawl will hold the sun gear from rotating so that the planetary gearing is in driving relation to modify the drive from shaft 10 to the tail shaft, and when the pawl is released from the sun gear, the planetary gearing idles.

The pawl is controlled by an electric and spring system having several types of control means. The pawl has a stem 42 that extends into housing 43 fixed on casing C in which is arranged a solenoid F including two coils 44 and 45. These coils when energized provide for moving the rod and connected pawl in a direction to enter one of the recesses 41 in the sun gear ring but entrance to the recesses is prevented by an apertured blocker member 46 extending in the path of such movement and frictionally rotatable by the sun gear extension. Upon reversal of torque this blocker member will shift with the sun gear so that its aperture registers with one of the recesses 41 allowing the pawl to pass through to engage and hold the sun gear from rotating. Likewise upon torque reversal with the solenoid deenergized, the pawl can be removed from the sun gear recess by suitable spring release means 47.

The electrical system for controlling the engine ignition and the solenoid includes the motor vehicle battery 50, ammeter 51, ignition switch 52, coil 53, ignition distributor 54 and engine starter switch 55. The ignition switch, ammeter and a manually controlled switch 56 are arranged at the vehicle instrument panel (not shown). The dash switch, a grounded governor controlled switch 58 and a foot operated kick switch 59 are connected in series. Also located at the instrument panel is an indicator light bulb 60. There is a connection 61 between the battery 50 and the ammeter 51, another connection 62 between the ammeter and the ignition switch 52, another connection 63 between the ignition switch and the coil 53 and a connection 64 between the coil and the distributor 54. Switch 58 is grounded and there is a connection 58' between this switch and the kick switch 59. There is a connection 65 between the kick switch and dash switch 56. For a detailed showing of the electrical system and controls, reference may be had to application Serial No. 279,165, filed by Clyde R. Paton, June 14, 1939.

In the solenoid housing is provided a bracket structure 68 within which a slidable armature 69 having a flanged cap 70 is mounted, the coil spring 47 being arranged between the bracket and flange and around the armature. Rod 42 extends axially through the armature in slidable relation therewith and on the end of the rod, remote from the pawl, is a switch contact 71 adapted to cooperate with grounded contact 171. Within the hollow portion of the armature is a coil spring 72 bearing at one end against the flanged cap 70 and at the other end against a retainer 73 fixed on the pawl rod. Spring 47 normally exerts sufficient pressure to hold the armature disengaged from the sun gear when the solenoid is deenergized.

Spring 72 when compressed is charged to move the pawl into one of the recesses 41 in the sun gear but if allowed to do so while the gear is rotating breakage would occur. The blocker ring 46 is arranged to prevent the entrance of the pawl under influence of spring 72 into a sun gear recess until torque reversal takes place. Winding coil 44 is arranged to have sufficient capacity to overcome the spring 47 and move the armature toward the pawl when the solenoid is energized, and the winding coil 45 is designed to have sufficient capacity to hold the armature in extended position into which it is shifted by the primary winding coil. Coil 44 is connected with contact 75 arranged to lie out of the path of movement of the armature cap and in relation to be engaged by the grounded switch arm carrying contact 74 that lies in the path of movement of the armature cap and normally engages contact 75. Thus when the armature is energized, movement of the cap flange will carry the contact 74 away from contact 75 to thus break the circuit through coil 44. The holding coil 45 is grounded so that it will hold the solenoid in the position it has been moved to by coil 44 after the circuit is broken by disengaging contacts 74 and 75. This movement of the armature does not shift the pawl rod but compresses spring 72 thus "cocking" the pawl until torque reversal takes place. Torque reversal must also take place before the pawl can be withdrawn from the sun gear recess by spring 47 during operation of the transmission, and this is accomplished by temporarily grounding the engine ignition system.

In the ignition and solenoid control system there is a relay 80 having two coils 81 and 82 controlling three plunger solenoid switches 83, 84 and 85. Connector 86 leads from line 61 to one contact of switch 83 and connector 87 leads from the other contact of switch 83 to the signal light 60 and to the primary relay coil 82. Coil 81 is connected at one end with connector 86 and at the other end with connector line 88 leading to a contact of the lock-out switch 56. One contact of switch 84 is connected with a contact of switch 85 by line 89 and the other contact of switch 84 is connected with line 64 by line 90. Coil 82 is connected with the grounded solenoid coil 45 by line 91 and one side of switch 85 is connected with a contact of the grounded switch contact 95 by line 92. One end of solenoid coil 44 is connected by line 93 with line 87 leading to the light bulb 60 and the other end of this solenoid coil is connected with contact 74. A normally closed switch consisting of a grounded contact carrying arm 94 and contact carrying arm 95 are arranged above the switch contacts 171 and 71, the arm 94 being normally in closed position. This arm 94 is held away from contact 95 by the switch 71, 171 when the armature is in extended position in which the pawl is released from the sun gear. Switch contact 171 is connected with light bulb 69 by line 96.

When the pawl 40 is withdrawn from the sun gear so that it is free to rotate and clutch 26 is disengaged from clutch plate 21, the drive will be from shaft 10 to the tail shaft through hub 19 and the overrunning rollers 23. When the sun gear is free and clutch 26 is shifted to engage plate 21, the drive will be direct and two-way between shaft 10 and the tail shaft. When the sun gear is held stationary by the pawl 40, clutch 26 must be disengaged from clutch plate 21 and provides a driving connection between the planetary gearing and the tail shaft.

As previously stated, the clutch and gear member 14 is slidably splined on transmission shaft 10 and its shifter 16 can be moved by suitable mechanism to positively engage clutch teeth 100 on low speed forward drive gear 11 or to engage reverse idler gear 12. In order to provide a positive drive from shaft 10 to the tail shaft when the clutch and gear member 14 meshes with the reverse drive gear, mechanism is provided to be actuated by the shifting mechanism for clutch and gear member 14 to shift the clutch 26 into engagement with plate 21. Such mechanism consists of a stem 101 axially movable through casing wall D having an enlarged end 101' engaged by and shiftable with clutch shifter member 15 when moved from neutral position into reverse drive establishing position. This stem 101 engages the bent end 102 of a rod 103 suitably mounted to slide axially in a wall of casing C. Rod 103 terminates in a reduced end 104 that extends through clutch yoke 105 and the shoulder formed by the two diameters of such rod abuts the yoke. Thus rod 103 will move the clutch yoke 105 therewith when moved rearwardly by rod 101 upon shifting of the clutch and gear member 14 rearwardly from neutral position to establish reverse drive. This rearward movement of the clutch yoke, upon the establishment of reverse drive in the change speed gearing, will have shifted clutch 26 to establish a positive drive between shaft 10 and the tail shaft through engagement with clutch plate 21 fixed on shaft 10, clutch 26 at all times being splined to the tail shaft.

The switch 58 is under the control of a governor arranged to be driven in accordance with the vehicle speed through mechanism that is operative only during forward drive. On the tail shaft is fixed gear 150 and meshing therewith is a gear 151 carried by a shaft 152. The lower end of the shaft is rotatably mounted in a socket 153 in casing C and the upper end of such shaft is formed with cam surfaces 154. The hollow end of shaft 155 telescopes the cam surfaces providing a space for the one-way clutch rollers 156. The upper end of this shaft 155 is of reduced diameter and formed with cam surfaces 157, similar to surfaces 154. One end of a two-part shaft 158 telescopes the cam surfaces 157 and one-way drive clutch rollers 159 are provided therebetween. These two clutches operate similarly and are arranged to provide a driving coupling only when the tail shaft is rotating in a direction to drive the vehicle forwardly. The upper clutch is included as a safety factor so that if for any reason the lower clutch becomes locked then the drive to shaft 158 will still be in the one direction only.

Fixed to the upper end of shaft 158 is the governor 58 consisting of a base 160, a pair of weights 161 pivoted on the base, and suitable spring means opposing the outward movement of the weights by centrifugal force resulting from rotation of the driving shaft means. The weights are arranged to control the position of an over-center switch mechanism 162 that is connected to contact 163 of line 64 and adapted to be engaged or spaced from ground contact 164. This centrifugal switch is of conventional design and is arranged to be opened below some predetermined vehicle speed, and to be closed above a predetermined vehicle speed provided the governor is being driven. Thus when the transmission is driving the vehicle in reverse there will be no drive through the governor shaft means and the governor switch 58 will be open so that the pawl cannot be moved by the electric control system to hold the sun gear.

The kick switch 59 is arranged to be normally closed but can be opened when the throttle pedal is pressed down beyond wide open throttle position. As the switches 56, 58 and 59 are in series, they must all be closed to energize the solenoid to establish overdrive. When in forward direct drive with switches 56 and 59 closed, the governor switch 58 will automatically close above some predetermined vehicle speed, thus energizing the electrical control system and closing normally open switch 83 and opening normally closed switch 84 in the relay. This allows current to flow to the solenoid cocking coil 44 and to the indicator bulb 69 as well as through the second relay coil which closes switch 85 to permit current to energize the solenoid holding coil 45. The indicator light on the instrument board reminds the driver that the mechanism is ready to be shifted to overdrive and this is accomplished by lifting the foot from the accelerator pedal thus allowing the sun gear to slow down and reverse so that the blocker will shift and allow the pawl to be shifted into a sun gear recess by the cocking coil spring 72. Pawl plunger motion in engaging direction shuts off the indicator light by opening switch 71, 171, breaks the cocking coil circuit by opening switch contacts 74, 75 and allows switch contacts 94 and 95 to engage.

Direct drive may be obtained by opening any one of the switches 56, 58 and 59. This breaks the circuit in the main relay coil 81, opening switch 83 and closing switch 84. The circuit to the second relay coil 82 is also broken but the disconnection is not immediately made because it is held by a momentary surge of current produced by the magnetic energy in the holding coil 45. During this instant, since both switches 84 and 85 are closed, the ignition is short-circuited for a brief time and the resulting hesitation of the engine, although imperceptible, removes the torque pressure from the pawl and allows its withdrawal by spring 47. Thus while in overdrive and forward direct drive is desired, the kick switch is opened by movement of the accelerator pedal beyond wide open throttle position, or by shifting clutch 26 to engage plate 21. Of course direct is also established when the governor switch automatically opens.

When the reverse gearing is engaged the clutch 26 is shifted to provide direct drive from the shaft 10 to the tail shaft and the shift rod 107 and clutch yoke 105 will be shifted together due to their securement by the set screw 108. The spring 109 acts constantly to return this clutch and rod to disconnect the positive drive. While the drive is reverse, the shift mechanism maintains clutch 26 in shifted position thus coupling plate 21 and the tail shaft.

With the control mechanism herein described it is impossible for the pawl to be moved to overdrive position while the drive is in reverse.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a vehicle transmission overdrive mechanism, a planetary gearing, said gearing including a sun gear adapted to be held or released to establish overdrive or direct drive, a shiftable pawl, spring means normally releasing said pawl from the sun gear, electro-magnetic means operable to cause the pawl to engage and hold the sun gear including a switch, and governor means controlling said switch including a one-way drive.

2. In a vehicle transmission mechanism having a transmission shaft selectively operable to drive the vehicle forwardly or reversely, planetary gearing coupled to the transmission shaft including a sun gear, a tail shaft, a pawl shiftable to hold or release the sun gear, clutch means drivingly connecting the planetary gearing with the tail shaft and shiftable to drivingly connect the transmission shaft directly with the tail shaft, control means for the pawl comprising spring means urging the pawl out of engagement with the sun gear, an electro-magnetic system for engaging the pawl with the sun gear including a switch, and governor means controlling the switch comprising a one-way drive coupled to the tail shaft, said governor drive operating only when the tail shaft is turning in a forward drive direction.

3. In a vehicle transmission overdrive mechanism for a tail shaft, planetary gearing including a sun gear, a shiftable pawl operable to hold or release the sun gear, an electro-magnetic system operable to actuate said pawl including a switch, a governor operable to control said switch, and drive means for the governor driven from the tail shaft including a one-way drive clutch.

4. In a vehicle transmission drive, planetary gearing including a sun gear adapted to effect an overdrive when held stationary, means shiftable to engage and hold said sun gear, a spring normally disengaging said means from said sun gear, an electro-magnetic system including a control switch adapted to move said means into holding engagement with said sun gear, a governor operable to close said switch when said transmission mechanism is in forward drive and above a predetermined speed, and a governor drive operable from the transmission mechanism including a one-way clutch.

5. In a vehicle transmission mechanism, a driven shaft, a tail shaft, planetary gearing connected with said shafts including a sun gear, said gearing driving the tail shaft at a different speed than that of the driven shaft when said sun gear is held, shiftable means for holding or releasing said sun gear, a spring urging said shiftable means in one direction, electromagnetic means including a switch operable to urge said shiftable means in the opposite direction to that in which it is urged by said spring, a governor operable to control said switch, and one-way mechanism driven from the tail shaft for operating said governor.

WALTER BANTA.